United States Patent
Wilson

(10) Patent No.: US 6,442,715 B1
(45) Date of Patent: *Aug. 27, 2002

(54) LOOK-AHEAD REALLOCATION DISK DRIVE DEFECT MANAGEMENT

(75) Inventor: Aaron W. Wilson, Berthoud, CO (US)

(73) Assignee: STMicroelectrics N.V. (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/187,061

(22) Filed: Nov. 5, 1998

(51) Int. Cl.[7] .......................... G11C 29/00; G06F 11/00
(52) U.S. Cl. ...................... 714/710; 714/718; 714/708
(58) Field of Search ............................... 714/710, 718, 714/708; 369/53.15, 53.16, 53.17

(56) References Cited

U.S. PATENT DOCUMENTS

| | | | | |
|---|---|---|---|---|
| 5,428,787 A | * | 6/1995 | Pineau | 395/700 |
| 5,455,721 A | * | 10/1995 | Nemazie et al. | 360/51 |
| 5,619,723 A | * | 4/1997 | Jones et al. | 395/823 |
| 5,818,654 A | * | 10/1998 | Reddy et al. | 360/53 |
| 5,974,544 A | * | 10/1999 | Jeffries et al. | 713/1 |
| 5,995,308 A | * | 11/1999 | Assouad et al. | 360/53 |
| 6,034,831 A | * | 3/2000 | Dobbek et al. | 360/53 |
| 6,064,535 A | * | 5/2000 | Wilson et al. | 360/60 |
| 6,098,185 A | * | 8/2000 | Wilson | 714/710 |

* cited by examiner

Primary Examiner—Peter Wong
Assistant Examiner—Tim Vo
(74) Attorney, Agent, or Firm—Lisa K. Jorgenson; Steven H. Slater

(57) ABSTRACT

Disclosed is a storage media defect management method for use in a storage device that is to be coupled to a computer. The method broadly includes writing data to a storage media of the storage device, the storage media having a plurality of servo fields. Stopping the writing upon detecting an off-track or other servo field error with a particular servo field of the plurality of servo fields. Reallocating a plurality of suspect sectors that may be affected by the off-track or other servo field error detected in the particular servo field. The method then proceeds to resume the writing beginning with a next sector following the plurality of suspect sectors that were reallocated. In a preferred implementation, a number of preliminary checks are preferably performed on the plurality of suspect sectors to ascertain which ones may be part of the reallocation transfer. However, the plurality of suspect sectors that are reallocated will preferably not be more than a maximum look-ahead number set in accordance with a disk zone that the current track being written lies. In this manner, maximum look-ahead reallocation number can be custom implemented depending on which track of the media the servo error is detected.

34 Claims, 7 Drawing Sheets

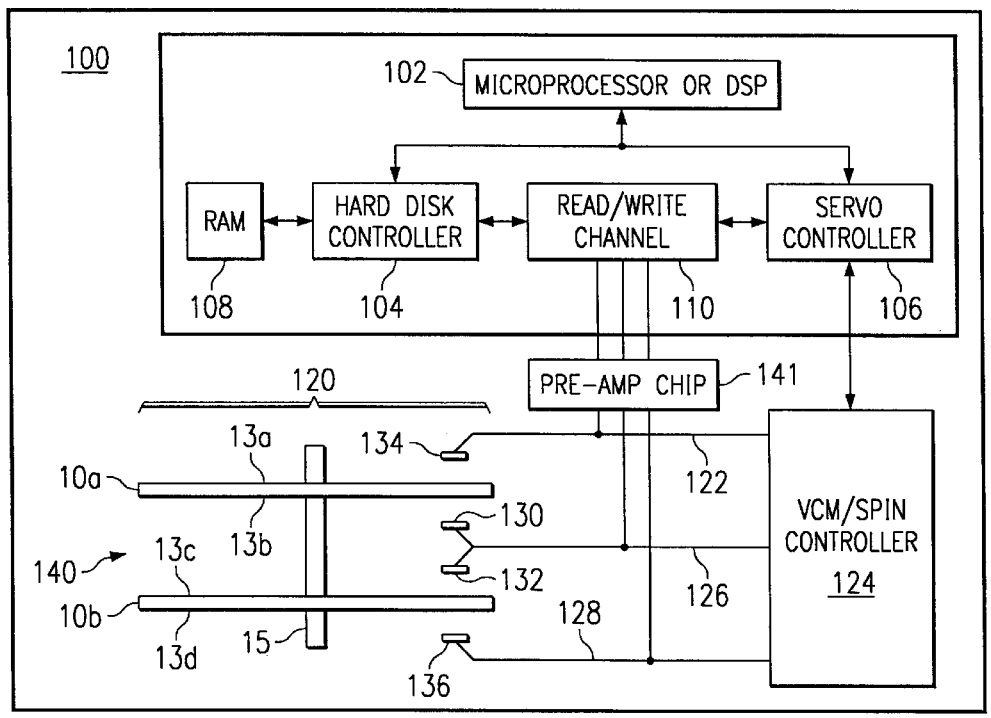
FIG. 2A
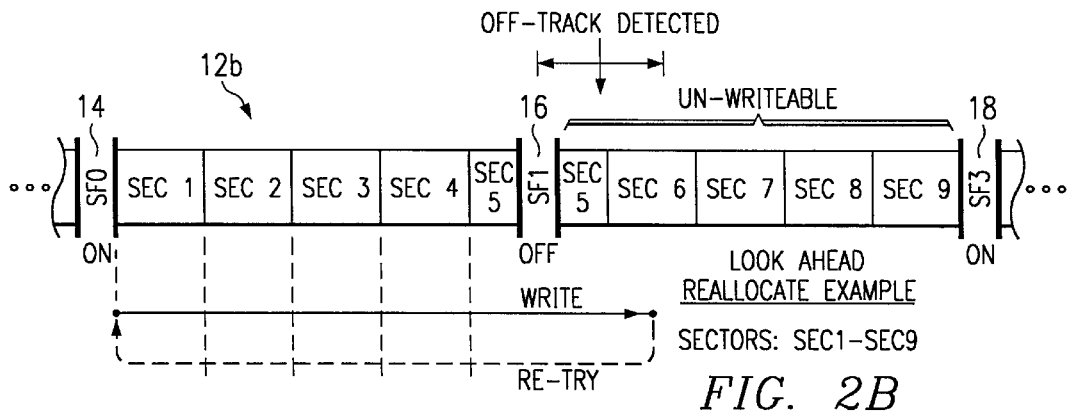
FIG. 2B
| LOOK AHEAD REALLOCATION | |
|---|---|
| A | MAX SECTORS POSSIBLY AFFECTED BY A SERVO DEFECT |
| B | MAX SECTORS POSSIBLY AFFECTED BY A SERVO DEFECT IN A CURRENT ZONE |
| C | CALCULATION OF ACTUAL SECTORS THAT WILL BE AFFECTED BY A SERVO DEFECT IN QUESTION |
FIG. 2C

LOOK-AHEAD REALLOCATION DISK DRIVE DEFECT MANAGEMENT

BACKGROUND OF THE INVENTION

1. Field of the Invention

This invention relates generally to computer storage devices, and more particularly to methods, circuitry and software for managing defects in computer storage media, such as computer disk drive media.

2. Description of the Related Art

Disk drive media virtually always contains defective areas, where it is impossible to reliably record and read back data. Rather than take a manufacturing yield loss, systems have been created to avoid the recording of data on those defective areas. Typically, a given size media defect becomes more apparent and affects more data as data is required to be recorded more densely. Therefore, defect management schemes have been an essential facilitating component for the increase in disk drive capacity that has been occurring for many years.

Over the years, this function of avoiding defective areas has migrated from the host computer and operating system to the disk drive itself. This migration has been a logical extension of the integration of more functions on the disk drive circuitry. As a result, operating systems no longer have intimate information of such items as the geometry of the drive, the block ordering, skewing, or the defect management techniques employed. Removing this intelligence from the operating system has allowed disk drive vendors to optimize these items for the specific product. Thus, these items are now commonly implemented by a combination of firmware and hardware on the disk drive.

For background understanding, the physical address of a given block of data on a disk drive is composed of three components: cylinder, head, and sector. The cylinder represents the radius of the data, the head represents the disk surface of the data, and the sector represents the rotational position of the data. Collectively, this type of address is often referred to as a "CHS" address. The combination of cylinder and head is often referred to as a "track" address. When the host computer desires to transfer one or more data blocks, it specifies the address of the first block and a block count parameter to the disk drive. Most interfaces allow the data address to take the form of a CHS address, however, this is primarily for historical reasons. A CHS address passed by the host computer implies that the computer has knowledge of the geometry of the drive, the layout of the blocks (e.g., after transferring track X, it will know which track is next), the skewing, and the locations of the defects. As mentioned above, because these functions are now commonly embedded in the disk drive, the disk drive firmware translates the passed CHS address into an actual CHS address before accessing the data. For clarity, the host side CHS address is generally referred to as a "logical CHS" address, and the actual CHS address is referred to as a "physical CHS" address.

Modem disk drive interfaces allow the host to specify a logical block address (LBA). Some interfaces allow either LBA or logical CHS addressing, others allow LBA addressing only. An LBA is simply a block number that allows the host computer to access the data without any real or perceived information on the geometry, skew, layout, or of the location of media defects. Often, a logical block address is a byproduct of the logical CHS address conversion, and therefore it is generally more efficient to simply pass a logical block address from the host computer to the disk drive, if the interface allows either. However, most modem disk drives implement defect management during the address translation process, regardless of whether the address specified by the host computer was a logical CHS or LBA address.

Two major techniques are commonly used to avoid media defects: block slipping and block relocation. It should be noted here that other techniques have also been used over the years, however, these two techniques in various forms are used exclusively in virtually all modem disk drives. Furthermore, virtually most all modem disk drives commonly employ both techniques.

Block slipping is simply the avoidance of defective blocks by jumping over the defective block in the address translation process. Consider the following LBA to physical sector relationship shown in table A.

TABLE A

| LBA:    | 0 | 1 | 2 | 3 | 4 | 5 | 6 | 7 |   |
|---------|---|---|---|---|---|---|---|---|---|
| Sector: | 0 | 1 | 2 | 3 | 4 | 5 | 6 | 7 | 8 |

Physical sector 8 is reserved for use if a defective location is discovered, and is not normally accessible by the host computer. If physical sector 4 is determined to be defective, the address translation process can use this information to change the LBA to physical sector relationship and avoid the defect as shown in table B.

TABLE B

| LBA:    | 0 | 1 | 2 | 3 | x | 4 | 5 | 6 | 7 |
|---------|---|---|---|---|---|---|---|---|---|
| Sector: | 0 | 1 | 2 | 3 | 4 | 5 | 6 | 7 | 8 |

In this example, physical sector 4 is not addressable for host transfers. The address translation process avoids the defective sector while maintaining the correlation between the logical block address and the sequential nature of the data being stored. Therefore, sector 8 will now be addressable as LBA 7. The major advantage to block slipping is that it incurs minimal performance loss on multiple block transfers. In the above example, if all 8 logical blocks were being transferred, the actual transfer time is increased by only 12.5% due to the effect of the defect. However, the actual percentage of the time penalty associated with the defect is generally far less than this, because total access time also includes seek and rotational latency delays, which are unaffected by the defect.

Block slipping does have a major disadvantage. If a physical sector is determined to be defective after customer data has been placed on the drive, slipping the block requires user data to be moved. How much data must be moved is a function of the location of the defect versus the location of the pool. However, as is well known, moving user data is very problematic. For example, power loss during the process could result in corrupted data. Also, moving data can be very time consuming, which can cause host timeout issues. Therefore, because the movement of user data is risky and slow, block slipping is generally used only for defects found in the factory, or if used for defects found in the field, reserved sector pools are placed frequently enough (every track or every cylinder or some other limited range) such that the risk and time associated with the data movement are minimized.

The other defect management technique mentioned above is block relocation. Block relocation is the avoidance of defective blocks by jumping instead to another, out of sequence block, and then returning to resume the transfer. Reference is again made to the LBA to sector relationship of table A, where the physical sector 8 is reserved for use if a defective location is discovered, and is not normally accessible by the host computer. If physical sector 4 is determined to be defective, the address translation process can use this information to change the LBA to physical sector relationship and avoid the defect as shown in table C.

TABLE C

| LBA:    | 0 | 1 | 2 | 3 | x | 5 | 6 | 7 | 4 |
|---------|---|---|---|---|---|---|---|---|---|
| Sector: | 0 | 1 | 2 | 3 | 4 | 5 | 6 | 7 | 8 |

In this example, the address translation process avoids the defective sector, but does not maintain the correlation between the logical block address and the sequential nature of the data being stored. Accordingly, LBA 4 is out of order. Block relocation therefore relies on one or more pools of unused sectors, into which the logical block address accesses can be redirected as needed to avoid defective sectors. Disk drive vendors commonly place these pools at the end of each track, each cylinder, each zone, or one large pool at the end of the volume. Often, these pools are also common with block slipping pools. For example, consider the case where one sector per track is reserved. If a track has two defects, one of the defects may be slipped, thus consuming the spare sector, and the other defect may be relocated to a nearby track that has no defects.

Another common implementation that shares one reserved pool for slipped and relocated blocks consumes the pool from the earliest address upward for slipped blocks and from the highest address downward for relocated blocks. The design must always consider the effect of defective sectors within the reserved pools, however, and these approaches have the potential of further complicating the defect management process. The major advantage of block relocation is that newly defective sectors can be relocated with minimal movement of user data and the associated problems of block slipping. The major disadvantage of block relocation is that it has a negative impact on sequential performance, because the physical order of the blocks on the disk no longer correlate to the addressing order. Accordingly, to transfer a relocated block which is a part of a multiple sector transfer often requires two extra seek operations and introduces rotational latency delays.

Regardless of the specific techniques employed, defect management is fundamentally an address translation function. A user address is translated into a physical address and in the process, the location of defective sectors is factored in for the purpose of avoiding the defects. Thus, the location of the defective sectors is kept in RAM, where the information is readily accessible during address calculations. A non-volatile storage technique is also employed, so that defect location information is not lost through power cycles. However, because disk drive vendors are under enormous pressure to reduce costs, solid state non-volatile storage of the data is typically not practical. Therefore, a vast majority of defect management implementations store the defect location information on the disk itself.

There are many variations on the storage and retrieval of the defect information. For example, some vendors choose to store one large defect list on the disk, and retrieve it on the initial spin-up. Others periodically retrieve much smaller quantities of defect location information. The specific defect management design decisions made are often interrelated to the defect location storage and retrieval strategy. One very common problem, however, is that defects can exist in the area in which the defect information is stored. Therefore, disk drive vendors often write redundant copies of the defect information to ensure the information can be successfully retrieved.

As is well known, the number of defects on a modern disk drive can be quite large. For example, a 10 gigabyte disk drive with the traditional allowance of 1 defect per megabyte can potentially have 10,000 defects. However, this traditional defect allowance is changing, due to today's downward price pressures on disk drives. As such, disk drive vendors are constantly seeking to lower their manufacturing costs, and one way to do so is by spending less time finding defects. To ensure effective defect finding in less time, manufacturers often marginalize various electrical or track following parameters that affect error rate and label every error encountered as being caused by a media defect. As a result, the traditional allowance of 1 defect per megabyte is being displaced by numbers more like 5 defects per megabyte. Therefore, the same 10 gigabyte drive that may have 10,000 defects with the traditional allowance may now need to allow 50,000 defects. Generally, 4 bytes or more are needed to fully describe the location of a given defect. So the total amount of defect sector location information can easily exceed 200K bytes on a modern disk drive.

There are many possible ways to structure this defect location information. Because there can be so much data, the designer must consider the speed at which the relevant data can be found for a given address calculation. One very common technique is to order the information based on the sequential access order of the blocks. This has the advantage of requiring only a single potentially long look-up time at the front of a new read or write operation, followed by sequential access of the data as the disk transfer progresses. There are many other methods of achieving fast access, for example, hashing algorithms, but these always incur a size penalty which is very critical, and therefore ordered defect lists are the most common technique.

Defects can be discovered on either read or write operations. On a read operation, typically a defect is assumed to be found when the drive firmware detects that a sector has become difficult to read. Other techniques may be employed to ensure that the difficulty is indeed being caused by a media defect, for example, the sector may be rewritten and then the read operation attempted again. Write operations are different in that a media defect located within the data sector cannot be detected while actually writing the data. However, a defect in a nearby servo field will be detected and indicate that the write may not be have been successful. As is well known, servo fields are fields on the media placed periodically to provide feedback as to the position of the actuator, and the success of a write operation is typically a dependent on correct actuator position.

For example, reference is now drawn to Table D below, which shows 5 data sectors and 4 servo burst fields. The servo fields provide the feedback to ensure that write operations are on track and at the correct rotational position. Since the actuator can be moving off track during the write operation, the typical requirement for a write operation to be considered good is that all servo fields around the sector indicate correct position. For example, a successful write of: (a) sectors 0 or 1 requires correct position feedback from servo bursts 0 and 1; (b) sector 2 requires correct position feedback from servo bursts 0, 1, and 2; (c) sector 3 requires correct position feedback from servo bursts 1 and 2; and (d) sector 4 requires correct position feedback from servo bursts 1, 2, and 3. Therefore, a single media defect in a servo field can affect multiple sectors.

TABLE D

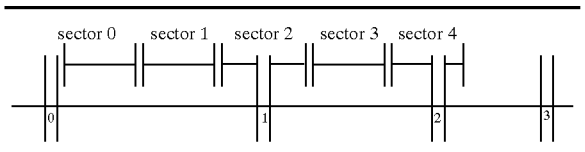

Disk drive test processes typically attempt to locate all media defects and add them to the defect list(s) so that the locations will be avoided when the disk drive is in use by the customer. However, many times new media defects become apparent in the user environment anyway. Some of the factors that may contribute to this are, for example, undesirable head/media contact, an incomplete defect scan during the factory test process, or contamination, the latter being of particular concern on removable media type products.

Some disk drives are designed to automatically detect these new defects during normal user operation and automatically begin avoiding these locations. Typically, the avoidance of these locations is done by the relocating process as described earlier, although some drives will implement defect slipping and move customer data as necessary. However, automatic reallocation processes can be very time consuming, and this has a negative impact on the performance of a disk drive. Furthermore, many times host computers place timeouts on disk operations, and time consuming automatic reallocation processes can unfortunately cause host timeout conditions.

This problem is, however, particularly undesirable on write operations, due to a common performance enhancement technique known as "write caching." Write caching refers to a process by which the disk drive notifies the host of write operation completion as soon as all of the data has been accepted from the host computer, but before the data has actually been written to disk. Modern disk drives that support write caching can typically accept many write commands, potentially before the first one is even complete. The timeout condition frequently occurs when the host sends one or more write commands, has been notified that they are complete, and then issues another command that relies on the completion of the write operations, for example a read operation, or a spin-down operation. Since the disk drive must complete the write operation before responding, it is critical that the actual write operation(s) be completed in a timely manner, so that a host timeout on the new command does not occur. As a result, automatic reallocation operations during those write operations can greatly slow their completion and cause a timeout.

Some of the factors that contribute to the extra time required to perform a write operation automatic reallocation include the following. The first factor is performing retries on the blocks. Disk drive systems will typically perform several retries on a block before determining that the write operation is unsuccessful due to a media defect. This is because several things other than media defects can cause difficulty in writing, such as shock or vibration. The second factor is the amount of time required to insert the new defect locations into the defect list. As previously described, disk drive defect lists can be quite large, and often it is advantageous to order the list. So the insertion of a new location can often require moving all of the data beyond the insertion point. Even using other techniques, such as hashing algorithms or linked lists, insertion time can become an issue. The third factor is the amount of time required to move customer data. If the reallocation process implements a relocation only, this involves seeking to the relocation destination address and properly placing the data. If the reallocation process implements a block slip operation, this will involve moving all customer that is affected by the slip, which can be quite large. The fourth factor is the amount of time required to write the new defect location information onto the disk. After determining that a new defect exists and inserting the location information into RAM, the system must write this information to the disk, and typically it must write redundant copies. This can be very time consuming. The fifth factor is the propagation of servo field defects to multiple data sectors. After exhausting the retry count and reallocating a sector, the write operation will attempt to continue. However, many times the next sector will also be unwritable due to the manner in which a single servo field defect affects multiple data sectors. In some systems, this may require completely repeating the operations discussed with reference to factors one through four above.

It should be noted that many vendors choose to defer performing the operation described with respect to the fourth factor until after all write operations are complete. This is typically done to reduce the write reallocation time, in the case where multiple new defects are encountered. However, this adds risk, because there is more time between the reallocation process and the saving of the information on disk, which gives more opportunity for the information to be lost due to a power cycle. This can cause loss of user data because there is no record of the defect reallocation and therefore the user data cannot be recovered.

FIG. 1A shows a simplified top view of a partial magnetic disk 10, illustrating the track and sector format for a typical recording surface 13. The recording surface 13 therefore includes a plurality of concentric tracks 12a through 12n, which extend from about the center spindle 15 out to the periphery of the magnetic disk 10. As shown, each of the tracks include a plurality of sectors $S_1$ through $S_N$. The recording surface 13 is also typically divided by a plurality of servo fields 14, 16, 18, 20, etc., which extend from the center spindle 15 out to the periphery of the magnetic disk 10. For purposes of illustration, the servo fields 14, 16, and 18 of FIG. 1A are shown in FIG. 1B as servo fields SF0, SF1, and SF2, respectively. Each of the sectors, arranged in each of the particular tracks, are typically of fixed length, such as the exemplary 512 bytes. Because the sectors are typically of a fixed length, the servo fields will commonly separate the data of a particular sector, generating what is known as a split data sector. As illustrated in FIG. 1B, sectors 26 and 32 are each divided into two sector segments by the servo fields 16 and 18, respectively.

As mentioned above, the servo fields assist a magnetic disk device in determining when off-track errors or other types of errors occur during the writing of data to the magnetic disk media 13. To illustrate how data writing errors are handled when the servo fields indicate that an off-track error has occurred, FIG. 1C pictorially illustrates the prior art reallocation scheme that is most commonly implemented. Assuming that an exemplary data transfer that is intended to be written to a track of the magnetic disk 10 includes data sectors 1 through 9, the writing of data to the track 12b would begin after the servo field zero (SF0) 14.

In this example, also assume that the magnetic disk drive has determined that the writing of data up to servo field zero (SF0) was ON track as pictorially shown in FIG. 1C. Accordingly, a write operation 50 is commenced with the data of sector 1 and then sequentially written up to a point 50' when an off-track error is detected by the examination of the servo field 1 (SF1) 16. As illustrated, the detection of the off-track error that occurred by examining the data of servo field 16 happened sometime shortly after the reading and examination of the servo field 16. For this example, it will be assumed that the off-track error is detected somewhere during the time when sector 6 is being written to the track 12*b*. When the off-track error is detected at point 50', the writing operation 50 will cease and then will be commenced anew by retrying the write back at the start of sector 1. This, of course, will not occur until the disk has spun around once again in order to allow correct positioning for commencing the writing of sector 1 and its consecutive sectors that are part of the transfer.

Once again, an off-track error will be detected at point 50' where the writing will again stop and commence with sector 1. The write operation 50 is therefore retried a number of times (e.g., between 30–100 times) until a counter expires indicating that the error is actually an off-track error and the writing of sector 1 would cause an improperly written sector, which could be misaligned along the track 12*b*. Once the counter has expired on the number of retries for the write operation 50, sector 1 will be reallocated.

The reallocation of sector 1, will generally require that the address of sector 1 be inserted into the defect list and the destination address of that sector data also be properly identified in the defect list. As is well known, identifying where in the defect list the sector will actually be written depends upon the sector address. Because the defect list will generally already include many defect addresses, it will be necessary to identify the proper location where the defect address for sector 1 will be inserted.

After the location where the address for sector 1 is to be inserted is identified, the addresses below that address must be shifted to enable the proper ordered location in the defect list. Once the defect address has been inserted into defect list, the new defect list is written to the disk in a particular location, such as a reserved pool. Once the new defect list has been written to disk media, the sector 1 data is reallocated to a reserved pool location which is identified in the defect list address.

After sector 1 has been reallocated, the prior art technique reverts back to attempt writing of the data beginning with sector 2 on by performing a write operation 52. The write operation 52 will also stop at a point 52' after the off-track error is detected at some point after the servo field 16 has been read and analyzed by the disk hardware/software. At this point, the write operation 52 will again be retried beginning at sector 2.

This will thus continue until the retry counter expires being indicative that the servo field 16 does in fact, have some type of off-track error. At that point, sector 2 will be reallocated in the same manner as sector 1 was reallocated. Once sector 2 has been reallocated, the write operation will then begin again to try to write the data beginning with sector 3 on. The write operation 54 will therefore commence with sector 3 and then stop at a point 54' some point after the servo field 16. At point 54', write operation 54 will stop and then will be retried beginning again with sector 3. The retrying operations will therefore continue until a counter has expired. Once the counter has expired, the servo field 16 off-track error will be verified and sector 3 will be reallocated in the same manner that sector 1 and sector 2 were reallocated.

Still further, the prior art method will go back to try to write the data beginning with sector 4 during a write operation 56. The write operation 56 will therefore continue up to a point 56'. At a point 56', it is determined that the servo field 16 has some type of error. Due to this error, a retry operation will commence and the write operation 56 will continue again until a counter expires. Once the counter expires for the write operation of 56, the sector 4 will be reallocated in the same manner that sector 1, sector 2, and sector 3 were reallocated. Once sector 4 is reallocated, the method will again attempt a write operation 58 which commences with sector 5. This write operation will therefore continue up to a point 58' where it is determined that a servo error has occurred due to servo field 16. At that point, the write operation 58 will stop and a retry will be performed back beginning with sector 5.

The retries will therefore continue until a counter expires being indicative that the servo field does, in fact, have an off-track error. At this point, sector 5 will be reallocated in the same manner that sector 1, sector 2, sector 3 and sector 4 were reallocated. Due to the servo field off-track error detected with servo field 16, sectors 6, 7, 8 and 9, which form part of the exemplary data transfer, will also be reallocated. As can be appreciated, when a single servo error occurs due to the detection of an off-track error, the piecemeal and continual reallocation of sectors "one-by-one," is a very laborious process which has the downside of significantly impacting the performance of a disk drive system, whether the media is magnetic or optical, and whether the media is fixed or removable.

In view of the foregoing, there is a need for disk drive systems which will enable more efficient handling of servo field errors due to detected errors. A need also exists for a technique that will eliminate the continual piecemeal reallocation of sector data when a single servo field error is detected. The need is therefore clear for a technique that will improve a write operation implementing a reallocation process, such that less time is required to complete the writing operations, without introducing a risk of data loss.

SUMMARY OF THE INVENTION

Broadly speaking, the present invention fills these needs by providing a method, system, and hardware/software implementation to enable the automatic reallocation of multiple sectors at once when a new defect is discovered during a write operation performed to a storage media. It should be appreciated that the present invention can be implemented in numerous ways, including as a process, an apparatus, a system, a device, a method, or a computer readable medium. Several inventive embodiments of the present invention are described below.

In one embodiment, a storage media defect management method for use in a storage device that is to be coupled to a computer system is disclosed. The method includes writing data to a storage media of the storage device, the storage media having a plurality of servo fields. Stopping the writing upon detecting an off-track or other servo field error with a particular servo field of the plurality of servo fields. Reallocating a plurality of suspect sectors that may be affected by the off-track or other servo field error detected in the particular servo field. The method then proceeds to resume the writing beginning with a next sector following the plurality of suspect sectors that were reallocated. In a preferred embodiment, a number of preliminary checks are preferably performed on the plurality of suspect sectors to ascertain which ones may not be part of the reallocation transfer. However, the plurality of suspect sectors that are reallocated will preferably not be more than a maximum look-ahead number, which in this embodiment, is determined by ascertaining what zone in of the storage media the current track is being written. In this manner, maximum look-ahead reallocation number can be custom set depending on which track in the media contains the servo error.

In another embodiment, a sector reallocation system for performing defect management of data being written from a host computer to a storage media is disclosed. The system includes transferring data to be written on the storage media from the host to a data buffer of a storage device. Then, the system writes data from the data buffer to a track on the storage media. The storage media having a plurality of servo fields. Upon detecting an error in a recent servo field of the plurality of servo fields, the system discontinues the writing to the track on the storage media, and retries writing until a retry counter expires due to a continued detection of the error in the recent servo field. The system includes setting a maximum look-ahead reallocation that defines a maximum number of sectors that can be affected by the error detected in the recent servo field of the storage media. The system is then configured to perform a number of checks to ascertain a number of planned sectors of the maximum number of sectors that are to be reallocated. In this manner, the number of planned sectors will be less than or equal to the maximum number of sectors (i.e., the max look-ahead reallocation number). After the checks are performed, the system reallocates the number of planned sectors, and resumes the writing of the data from the data buffer to the track on the storage media beginning with a next sector after the reallocated number of planned sectors.

In yet another embodiment, a computer readable media containing program instructions for performing sector reallocation defect management is disclosed. The computer readable media includes: (a) program instructions for initiating a writing of data to a storage media having a plurality of servo fields; (b) program instructions for causing a discontinuation of the writing upon detecting an off-track or other servo field error with a particular servo field of the plurality of servo fields; (c) program instructions for detecting when a re-try counter has expired; (d) program instructions for causing a batch reallocation of a plurality of suspect sectors that may be affected by the off-track or other servo field error detected in the particular servo field; and (e) program instructions for causing a continuation of the writing beginning with a next sector following the plurality of suspect sectors that were reallocated.

In still another embodiment, a computer controlled reallocation defect management method implemented on hardware and directed by program instructions is disclosed. The method includes: (a) initiating a writing of data to a storage media having a plurality of servo fields; (b) causing a discontinuation of the writing upon detecting an off-track or other servo field error with a particular servo field of the plurality of servo fields; (c) detecting when a re-try counter has expired; (d) causing a batch reallocation of a plurality of suspect sectors that may be affected by the off-track or other servo field error detected in the particular servo field; and (e) causing a continuation of the writing beginning with a next sector following the plurality of suspect sectors that were reallocated.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 2A illustrates a system level architecture view of a magnetic disk device in block diagram form, in accordance with one embodiment of the present invention.

FIG. 2B pictorially illustrates a simplified view of the look-ahead reallocation technique in accordance with one embodiment of the present invention.

FIG. 2C illustrates a look-ahead reallocation table providing suitable techniques for determining a maximum number of sectors that may be reallocated upon detecting an off-track servo defect.

DETAILED DESCRIPTION OF THE PREFERRED EMBODIMENTS

Figure 1A:
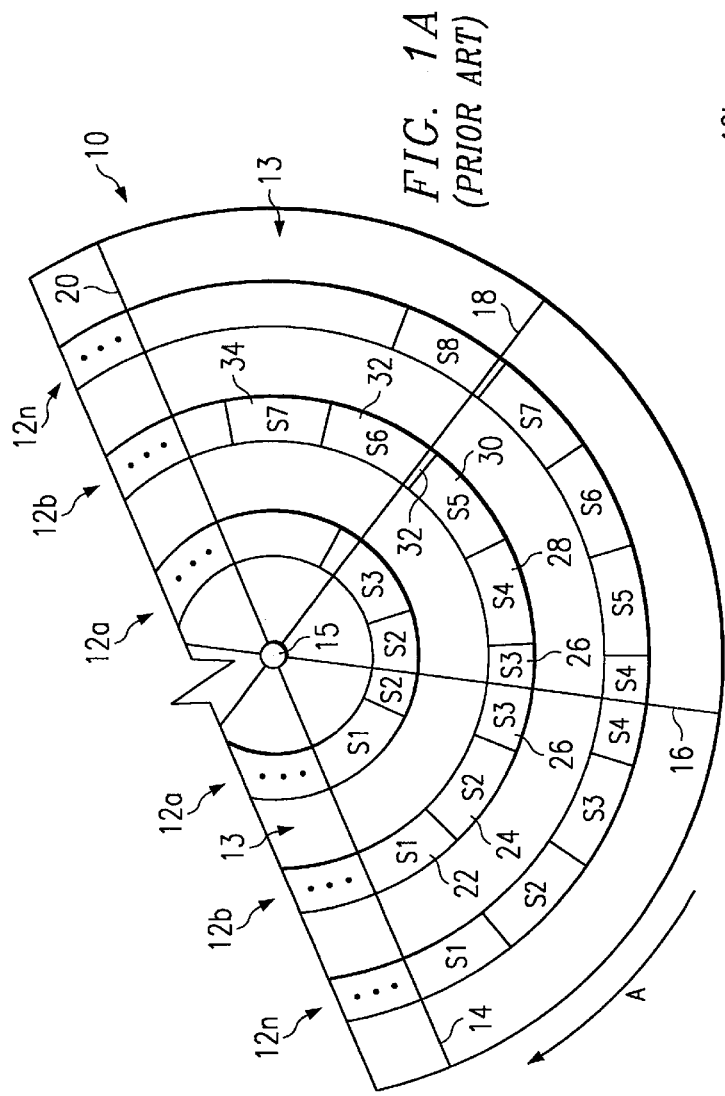
FIG. 1A shows a simplified top view of a partial magnetic disk, illustrating the track and sector format for a typical recording surface.
Figure 1B:
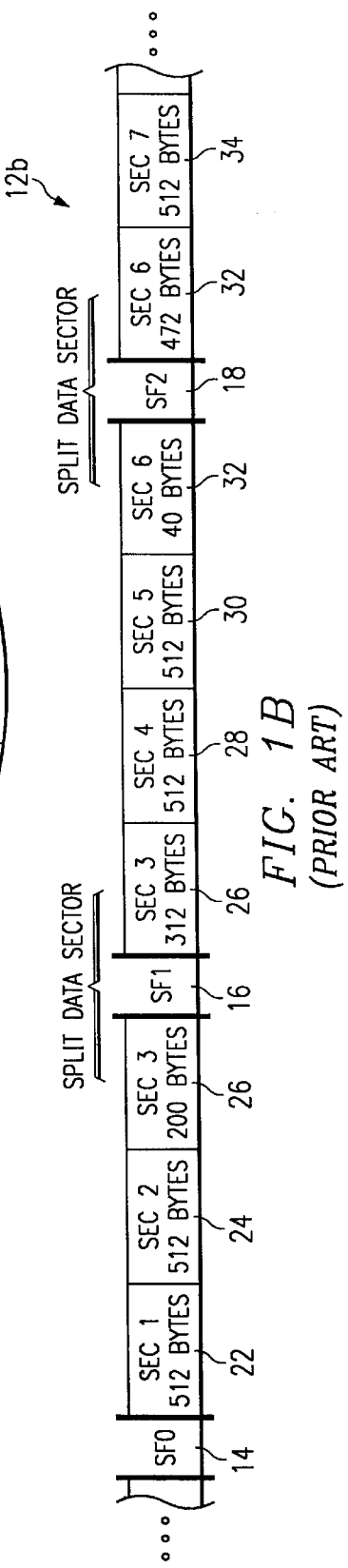
FIG. 1B is a more detailed view of a partial track of the magnetic disk of FIG. 1A.

An invention is described for a method, system, and hardware/software implementation to enable the automatic reallocation of multiple sectors at once when a new defect is discovered during a write operation to a storage media. It will be obvious, however, to one skilled in the art, that the present invention may be practiced without some or all of these specific details. In other instances, well known process operations have not been described in detail in order not to unnecessarily obscure the present invention.

As a brief and broad overview of the present invention, if a given sector is determined to be unwritable due to a servo defect in a particular servo field, the present invention would preferably simultaneously reallocate a group of sectors that may possibly be affected without first attempting to write the data for each sector at a time. So a write failure on a particular sector would trigger multiple reallocations in accordance with this inventive look-ahead reallocation technique. In general, look-ahead reallocation greatly reduces the reallocation time during defect management for several reasons. First, no time is spent performing retries on each of the possibly affected sectors beyond the first sector determined to be affected, they are simply assumed to be unwritable because of the initially unwritable sector caused by the servo field defect. Second, the insertion of the defect locations into a defect list can be done for multiple sectors at once, which is much faster than multiple insertion processes of one address each. Third, if the reallocation method requires the movement of customer data, that movement is performed much faster because multiple blocks of movement at once is faster than multiple movements of one block each. Fourth, the defect information needs to be recorded onto the disk only one time, instead of one time for each sector reallocated.

In the following detailed description, the look-ahead reallocation technique will preferably take into consideration several technical requirements. Initially, depending on the specific hardware and firmware design, the information as to which servo field prevented the writing of the target sector and exactly which data sectors will be affected may not be readily available, or the determination of this information may require an undesirable amount of complication, code space, or time. In this case, an algorithm of one embodiment is modified to reallocate a fixed number of sectors that represents the maximum number of sectors that could possibly be affected by a servo field defect. In some cases, more sectors than necessary will be reallocated, but that may be an acceptable trade-off. Also, with this method, it may be advantageous to vary the number of sectors to be reallocated based on the recording zone, because the maximum number of sectors that can be affected by a bad servo field varies with the zone.

Another consideration is that, in most cases, it will not be desirable to reallocate blocks beyond the target block unless the data is available in the data buffer. This is because once the reallocation is established, data must be written to the new location, and unless the data is available to be written, there is a risk associated with not receiving it from the buffer (i.e., the host may be lagging). Therefore, in the preferred implementations of the present invention, the look-ahead length will be limited based on the data available in the data buffer at the time of the reallocation.

A further consideration is that the system must take great care to ensure that the look-ahead blocks are in fact the physical blocks that will be transferred by the continuation of the write operation, and avoid reallocating any of these blocks that are not going to be a part of the reallocation transfer. This is, of course application specific, but Table E provides some example reasons why certain look-ahead blocks would not be a part of the reallocation transfer.

TABLE E

Look-ahead Blocks Not Part of a Transfer a) Any of the look-ahead reallocation sectors may already be slipped.
b) Any of the look-ahead reallocation sectors may already be relocated.
c) The sector which proved unwritable may have been the destination side of a relocated sector, and is therefore located in an area of sectors reserved for relocation destinations. In this case, the following sectors may or may not be a part of the transfer. If determining this introduces excessive complication or consumes undesirable code space or execution time, the designer may simply choose to disable the look-ahead function any time the sector in error is a relocation destination.
d) Any of the look-ahead sectors may extend into a reserved area, for example, an area reserved for slipping or relocation operations.
e) Any of the look-ahead sectors may extend onto a new track.
f) Any of the look-ahead sectors may extend beyond the end of the user area of the disk volume. Note that if the block count and length parameters have already been checked such that the transfer is known to be in a legal place, the data available limiting check described above may already satisfy this requirement.

Another implementation consideration involves the capacity and fullness of the existing defect list, and if the look-ahead operation will overflow the list. If this is a concern, the look-ahead length may be limited accordingly. Still further, the present invention takes into consideration an optimum defect list insertion algorithm. In one embodiment, the defect list will be an ordered list which can be shifted to create an empty area of adequate size to specify all of the new defect locations. The algorithm will then insert the new locations, taking care to preserve the sequential address order. In certain cases, the new data may need to be interleaved with existing data in the list. One way to accomplish this is to insert the new locations and then perform a sort on the affected area. A more detailed discussion of the defect list insertion algorithm will be provided below with reference to FIGS. 4C–5B. At this time, discussion will now turn to the following FIGS. 2A–5B, which illustrate preferred implementations of the look-ahead reallocation techniques which take into account the above described considerations.

FIG. 2A illustrates a system level architecture view of a magnetic disk device 100 in block diagram form. The primary components in magnetic disk device 100 include, but are not limited to, disk control components 102, 104, 106, 108, and 110 and operational disk components 120–124. Disk control components 102–110 include, but are not limited to, a microprocessor or Digital Signal Processor (DSP) 102, a Hard Disk Controller (HDC) 104 with accompanying RAM 108, a servo controller 106, and a read/write channel controller 110. The microprocessor or DSP 102 provides the highest level of control and coordination for all disk device activities and read/write operations executed by the disk control components.

HDC 104 manages and caches all data being written to and/or read from the magnetic disk. RAM 108 is used as a data cache in addition to table storage for disk related information such as split data sector information and/or defective data sector information as is done in conventional magnetic disk devices. The servo controller 106 interprets servo field information and controls positioning activities of read/write heads. Read/write channel 110 passes data through a pre-amplifier chip 141 between the operational disk components 120–124 and the disk control components 102–106 for each read/write operation.

Operational disk components 120–124 include, but are not limited to, a Head and Disk Assembly (HDA) 120 that includes a magnetic disk 120 and read/write heads 130, 132, 134, and 136, a Voice Coil Motor (VCM)/spin controller 124 that is operatively connected to access arms 122, 126, and 128 through a voice coil motor (not shown apart from VCM/spin controller 124). The magnetic disk 120 is comprised of one or more platters 10a and 10b. Each platter has at least one and typically two magnetic recording surfaces as illustrated for the first and second surfaces 13a–13b and 13c–13d of platters 10a–10b respectively. Each of the platters 10a–10b of a multiple platter magnetic disk 120 are rigidly fixed to a spindle 15 along a common central axis. VCM/spin controller 124 manages the appropriate physical movements of the access arms 128–122. VCM/spin controller 124 also manages the movement of spindle 15.

Read/write heads 130–136 are positioned to fly just off the recording surfaces 13a–13d respectively when the magnetic disk 110 is spinning. Although other magnetic disk device architectures are possible other than the architecture described above, no limitation is intended or implied with respect to the present invention. The present invention is applicable to any magnetic or optical disk regardless of a single platter or multiple platter implementation or a removable medium or floppy disk medium.

Figure 1C:
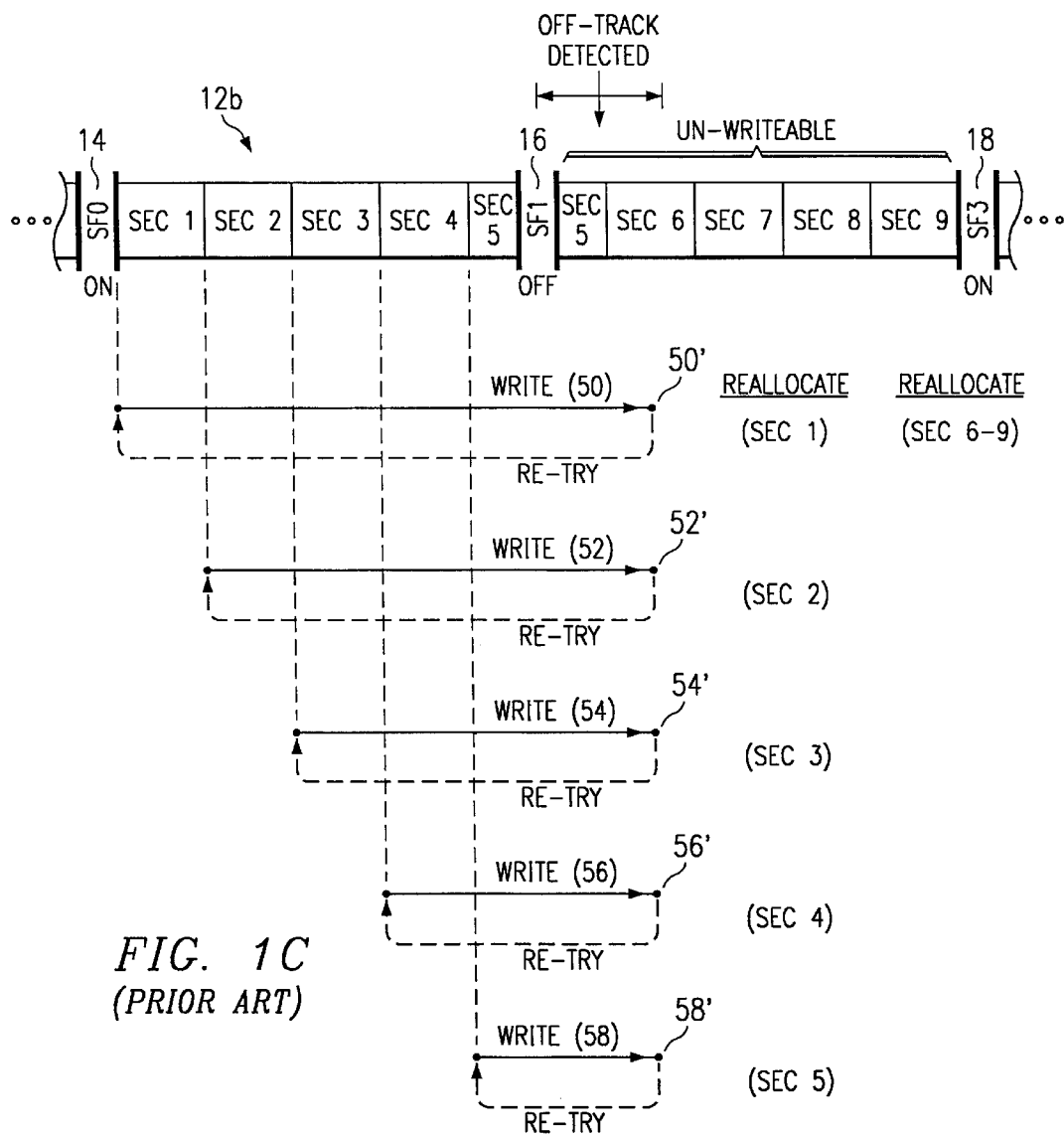
FIG. 1C is a pictorial illustration of a prior art reallocation technique.

FIG. 2B illustrates a partial track 12b, such as that previously described with respect to FIG. 1C above. In this example, the servo field 14 and the servo field 18 are assumed to be ON track, while the servo field 16 will be considered to be OFF track. During a normal write operation of data including, for example, sectors 1 through 9, a write operation will begin by writing sectors between servo fields 14 and 16 (of course, the write operation does not always begin at the end of a servo field, it can begin at any point between servo fields). During the write operation, at a point after the servo field 16, the off-track error detected by examining the servo field 16 will cause the write operation to stop. As is done in prior art implementations, a retry will commence to attempt a successful write of the sectors associated with this example data transfer.

Once a retry counter has expired after a number of unsuccessful write attempts due to the off-track error associated with servo field 16, a look-ahead reallocation will be performed in accordance with one embodiment of the present invention. In contrast with prior art techniques which, upon having a retry counter expire during attempts to write the data transfer beginning with a first sector, only the first sector (i.e., SEC 1) is reallocated as described above. In this embodiment, a look-ahead reallocation will be performed, such that a pre-determined number of sectors that may be affected by the servo field defect will be reallocated together in the form of a "batch" reallocation.

FIG. 2C illustrates a look-ahead reallocation table providing suitable techniques for determining a maximum number of sectors that may be reallocated upon detecting an off-track servo defect. For example, in option A, the look-ahead reallocation may be set to a maximum number of sectors that possibly could be affected by a servo defect. Typically, the maximum number of sectors that possibly could be affected by a servo defect may be limited to those sectors that are confined between, for example, servo fields 14 and 18.

In option B, the look-ahead reallocation may be set to a maximum number of sectors that may possibly be affected by a servo defect in a current zone. As is well known in the art, a magnetic disk media typically has a number of zones that include groups of adjacent concentric tracks in given regions of the disk. For example, a zone that is closer to the center of the disk may have a zone of sectors that each respectively have about 60 sectors per track. The next zone defining a group of sectors that are located radially outward from the first zone may have 80 sectors per track. In a like manner, a next zone closer yet to the outer radius of the disk may have tracks that each having 100 sectors per track. Accordingly, by first determining the zone in which the current track lies, it is possible to ascertain a maximum number of sectors that possibly could be affected by a servo defect in that current zone.

In option C, a more intensive calculation may be performed to determine the actual number of sectors that will be affected by a servo defect in the track in question. In either event, it should be understood that there are several ways in which the number of look-ahead reallocated sector numbers may be ascertained. For ease of implementation, a most preferred look-ahead reallocation technique will implement option B, which takes into consideration the zone in which the track having the servo error lies in the magnetic disk media.

Figure 3:
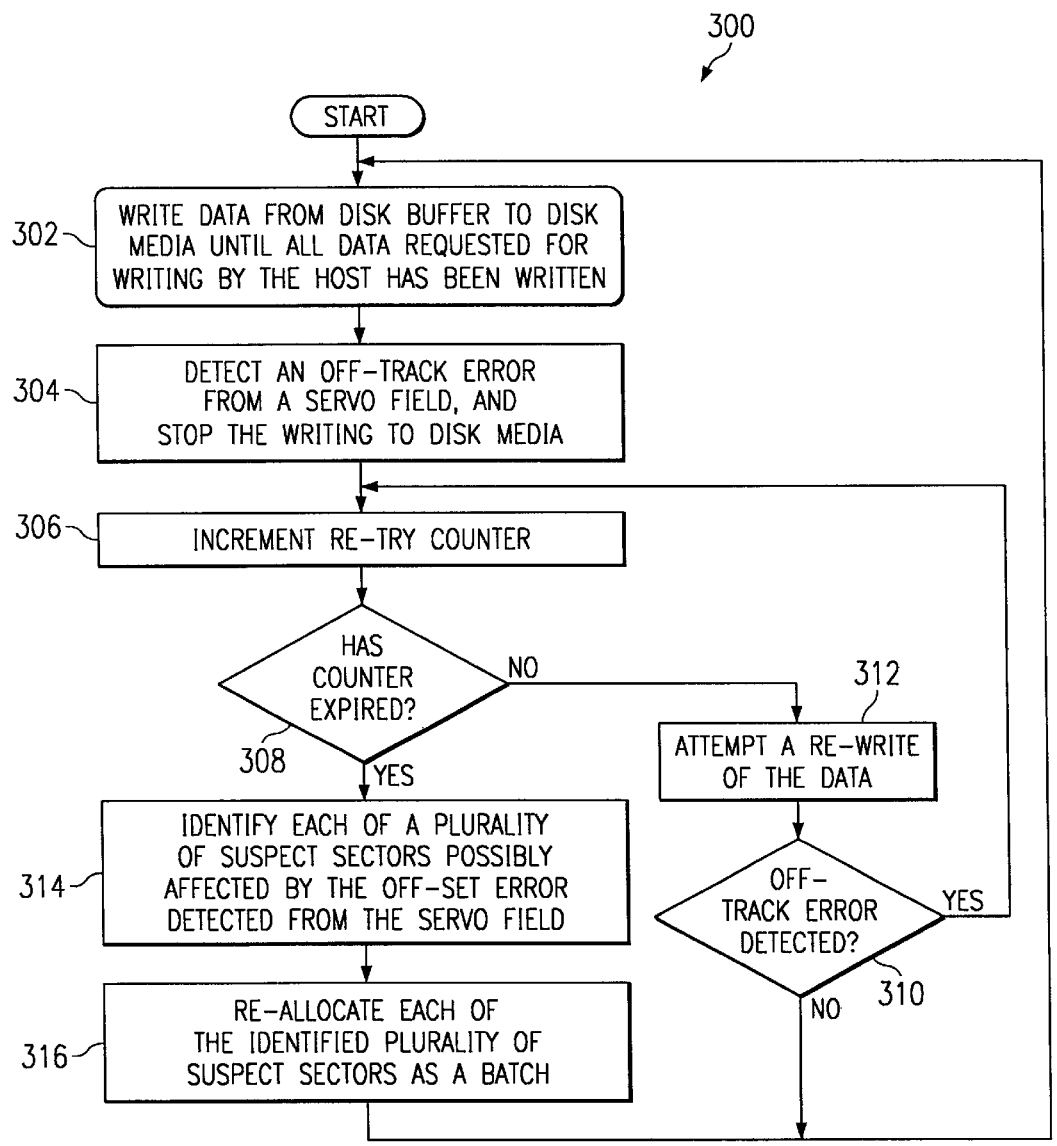
FIG. 3 illustrates a flowchart defining a high level overview of the inventive look-ahead reallocation technique in accordance with one embodiment of the present invention.

FIG. 3 illustrates a flowchart 300 defining a high level overview of the inventive look-ahead reallocation technique in accordance with one embodiment of the present invention. The method begins at an operation 302 where data is written from a disk buffer to a disk media until all data requested for writing by the host has been written. While the data is being written to the disk media, the method will proceed to the following operations, which include an operation 304. In operation 304, an off-track error is detected from the examination of a servo field, and the writing to the disk media is stopped. At that point, a retry counter is incremented in operation 306. In one embodiment of the present invention, the retry counter may be set to a number that is lower than typically implemented by prior art retry mechanisms.

For example, prior art retry counts may be in the range of 30 to 100, while the retry counter on accordance with the preferred methods of the present invention may be lowered to as low as 5 retries, and most preferably, between about 5 and 20. Of course, the lower the retry count, the higher the possibilities that an error other than a servo defect was the cause of the off-track error. In either event, by lowering the re-try count, the writing mechanism and the look-ahead reallocation technique will be able to process write operations and reallocations at a faster rate and therefore increase performance. Once the retry counter has been incremented in operation 306, the method will proceed to a decision operation 308.

In decision operation 308, it is determined whether the counter has expired. If the counter has not expired, the method will proceed to an operation 312 where a rewrite of the data will be attempted. Next, the method will proceed to a decision operation 310 where it is determined whether an off-track error is detected during the attempt to rewrite the data. If an off-track error is detected, the writing of the data to the disk will be stopped, and the retry counter will be incremented in operation 306. On the other hand, if an off-track error is not detected in operation 310, the method will proceed back up to operation 302 where data is written from the disk buffer to the disk media until all data requested for writing by the host has been written.

Assuming that an off-track or other servo error was detected in operation 310, the retry counter will be incremented in operation 306 and the method will again proceed to a decision operation 308. Once the counter has expired, the method will proceed to an operation 314 where each of a plurality of suspect sectors possibly affected by the offset error detected from the servo field will be identified. As discussed above with reference to FIG. 2C, the look-ahead reallocation number may be determined by several techniques. In a preferred embodiment of the present invention, option B which set the maximum sectors possibly affected by a servo defect in a current zone, is implemented. The method now proceeds to an operation 316 where selected ones of the identified plurality of suspect sectors are reallocated as a batch. As discussed above with reference to Table E, certain ones of the suspect sectors may not be part of the reallocation transfer for one or more reasons.

Once the correct number of sectors have been reallocated, the method will continue back up to operation 302 where the method will continue writing the data from the disk buffer to the disk media until all the data requested for writing by the host has been written. During this writing operation of course, the method will continue to operation 304 where the writing to the disk media may be stopped when an off-track error is detected from a servo field. If after a certain number of retries, writing of the data to a given track fails due to the off-track or other servo error detected at a particular servo field, the method will again reallocate selected ones of a plurality of suspect sectors possibly affected by the offset error detected by examining the servo field.

Figure 4A:
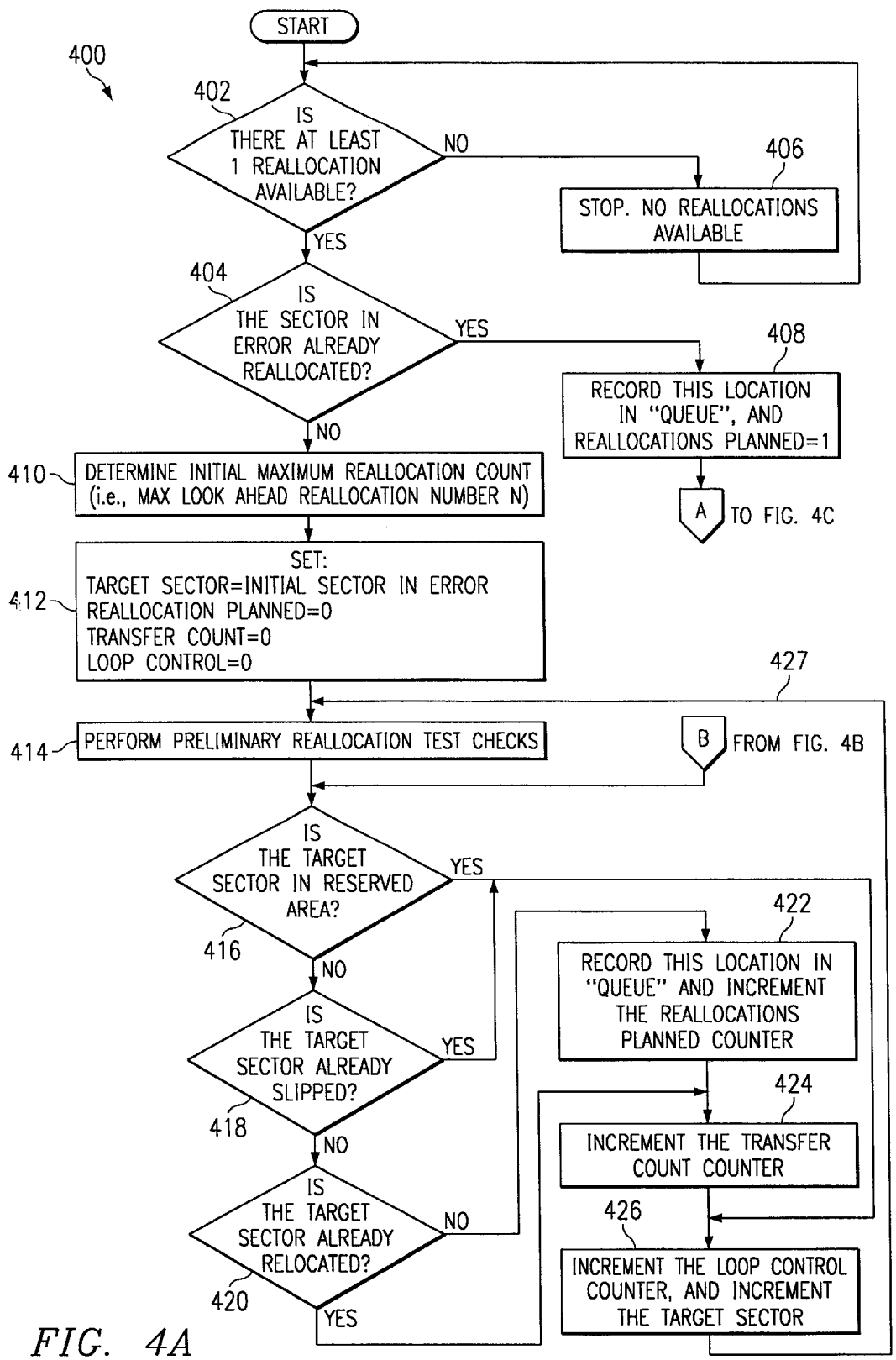
FIGS. 4A through 4C illustrate a more detailed implementation of the look-ahead reallocation technique implemented in accordance with one embodiment of the present invention.
Figure 4B:
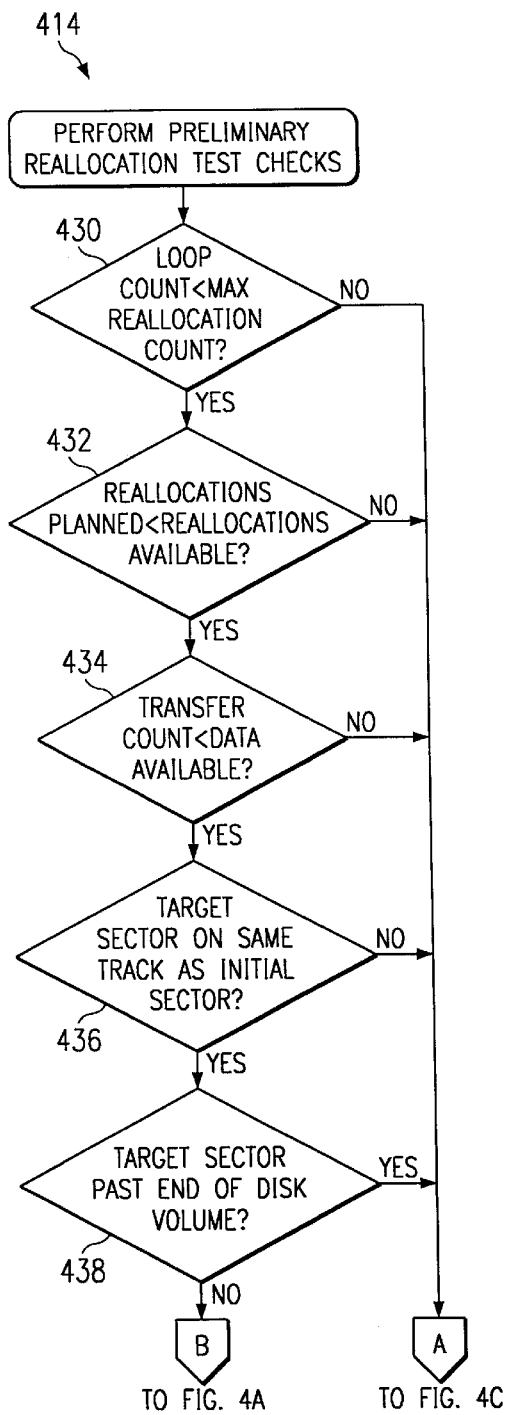
Figure 4C:
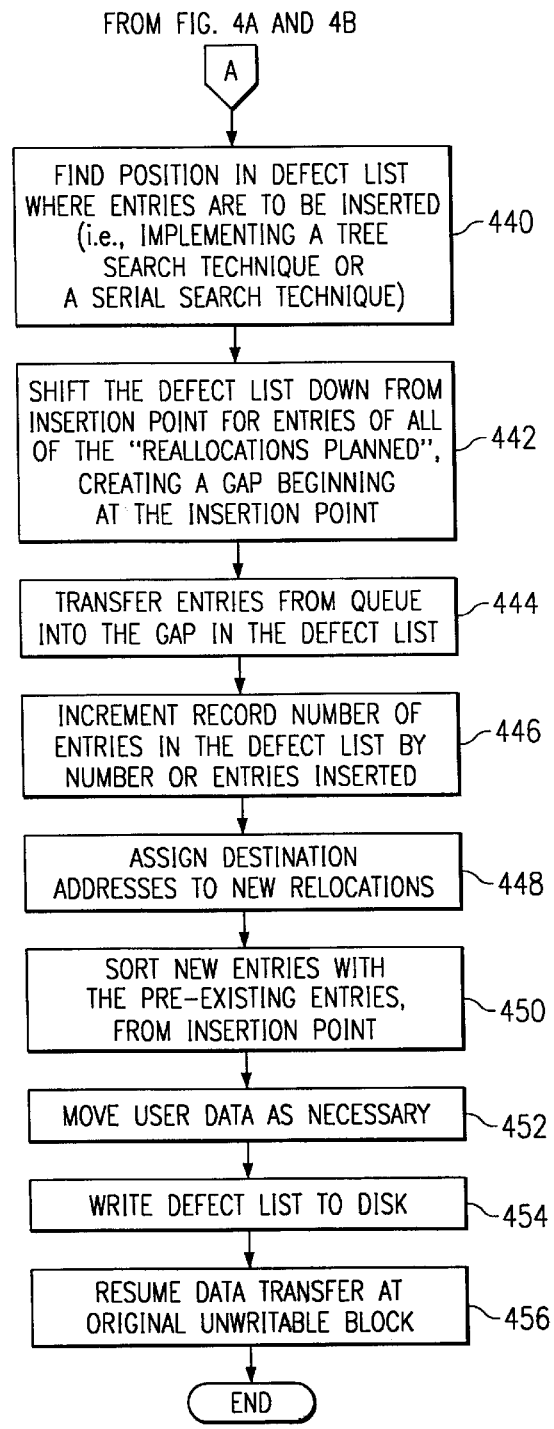

FIGS. 4A through 4C illustrate a more detailed implementation of the look-ahead reallocation technique implemented in accordance with one embodiment of the present invention. The more detailed reallocation technique will now be described with reference to FIG. 4A, where flowchart 400 begins after a new defect has been found on a write operation. The method therefore begins at a decision operation 402 where it is determined whether there is at least one reallocation available. If there isn't at least one reallocation available, the method will proceed to an operation 406 where the method will stop because no reallocations are available.

The method will therefore return back to decision operation 402 where the method will commence once there is at least one reallocation available. At that point, the method will proceed to a decision operation 404 where it is determined whether the sector in error was already reallocated. For example, this determines whether there is a servo error in a reallocated space. If there is, this will be irrelevant. Accordingly, if the sector has already been reallocated, the method will proceed to an operation 408 where this location is recorded in a queue, and the reallocations planned is set equaled to 1. At that point, the method will proceed to operation A. On the other hand, if it is determined in operation 404 that the sector in error has not already been reallocated, the method will proceed to an operation 410.

In operation 410, the method will determine the initial maximum reallocation count. The maximum reallocation count will therefore be the maximum look-ahead reallocation number N. As mentioned above, the maximum look-ahead reallocation number N may be set in a number of ways. The simplest is for the maximum count to equal the maximum sectors that can be affected by a servo field. The most preferred technique however, will be to set the maximum count equal to the maximum sectors that can be affected by a servo defect in a particular zone. In a more complex technique, the maximum count may be set equal to the actual sectors after the sector in error that will be affected by the servo field defect. This will of course, require more complex computation which could possibly place excess overhead for the local processor. Once the initial maximum reallocation count has been determined in operation 410, the method will proceed to an operation 412.

In operation 412, the target sector is set equal to the initial sector in error, the reallocation planned will be set equal to zero, the transfer count will be set equal to zero, and the loop control will be set equal to zero. Once these conditions have been set in operation 412, the method will proceed to an operation 414. In operation 414, preliminary reallocation test checks will be performed. The preliminary reallocation test checks take into consideration some of the points discussed with reference to Table E, and will be described in more detail below with respect to FIG. 4B. Once the preliminary reallocation test checks have been performed, the method will proceed to a decision operation 416.

In operation 416, it is determined whether the target sector is in a reserved area. This test, essentially ensures that a reallocation is not made to a sector located in a reserved area. Initially, the target sector will not be in a reserved area, but subsequently, the later target sectors may actually be in a reserved area. Assuming that the target sector is not in a reserved area, the method will proceed to a decision operation 418. In decision operation 418, it is determined whether the target sector has already been slipped. If the target sector has already been slipped, the target sector will not be part of the reallocation transfer and the method will proceed to a decision operation 426. Alternatively, if the target sector has not already been slipped, the method will proceed to a decision operation 420. In operation 420, it is determined whether the target sector has already been relocated. If it has already been relocated, the target sector will not be part of the reallocation transfer and the method will proceed to an operation 424. On the other hand, if the target sector has not already been relocated, the method will proceed to an operation 422 where the target sector address location is recorded in a queue and the reallocations planned counter is incremented. The method now proceeds to an operation 424 where the transfer count counter is incremented. As mentioned above, if it was determined in operation 420 that the target sector was already relocated, the method would have proceeded to operation 424 where the transfer count counter would also be incremented. Next, the method will proceed to an operation 426 where the loop control counter will be incremented, and the target sector will also be incremented. At this point, the method will again proceed back up to operation 414 where the preliminary reallocation test checks are performed on the next suspect sector, which will now be the target sector.

FIG. 4B illustrates in greater detail, the method operations performed during the preliminary reallocation test checks in accordance with one embodiment of the present invention. The initial test check is performed at a decision operation 430 where it is determined whether the loop count is less than the maximum reallocation count. If the loop count is not less than the maximum reallocation count, the method will proceed to perform the operations of block A, which will be described in greater detail with reference to FIG. 4C. Referring again to FIG. 4A, the loop 427 will therefore not be processed more times than the maximum look-ahead reallocation count that is set in operation 410. On the other hand, if it is determined in operation 430 that the loop count is less than the maximum reallocation count, the method will proceed to decision operation 432.

In operation 432, a determination is made as to whether the reallocations planned is less than the reallocations available. This check will ensure that there will be space available in the reserved pool for each of the reallocations planned during the look-ahead reallocation operation. If the reallocations planned is not less than the reallocations available, the method will proceed to perform the operations of block A. Alternatively, if the reallocations planned is less than the reallocations available, the method will proceed to decision operation 434.

In operation 434, the method will determine whether the transfer count is less than the data available. Because a writing of data requires that the host computer system transfer enough data to the RAM (i.e., data buffer) in order to complete the writing operation, it is important that the RAM have the data available to satisfy the transfer count. More specifically, the RAM is a speed matching device, and the disk will be pulling data out of the RAM as the host is putting data into the RAM. Therefore, if data is pulled out of the RAM faster than data is placed into the RAM by the host, the writing will get ahead of the host, thereby causing a shortage of data. When this occurs, a disk must spin around until enough data is placed into the RAM by the host and then writing will resume.

Therefore, when it is determined in operation 434 that the transfer count is less than the data available, the method will proceed to decision operation 436 where it is determined whether the target sector is on the same track as the initial sector. This check is performed to determine if the target sector is on a track that is different from the track containing the servo defect. If the target sector is on a track that is different than where the servo defect is located, the method will proceed to the operation of block A. On the other hand, if the target sector is on the same track as an initial sector, the method will proceed to decision operation 438.

In decision operation 438, it is determined whether the target sector is past the end of a disk volume. If it is past the end of the disk volume, the target sector will not be part of the user's block and the method will proceed to the operations of block A. On the other hand, if the target sector is not past the end of the disk volume, the method will proceed to decision operation 416 of FIG. 4A.

Figure 5A:
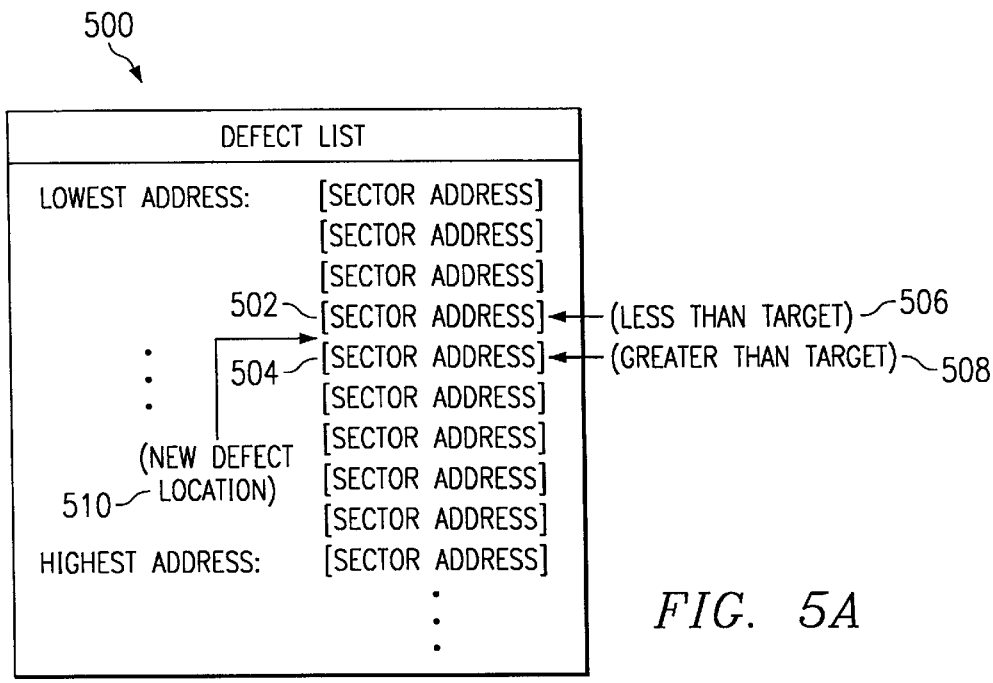
FIGS. 5A and 5B illustrate a defect list and one exemplary tree search technique implemented for finding the insert location for the new reallocation defect addresses.
Figure 5B:
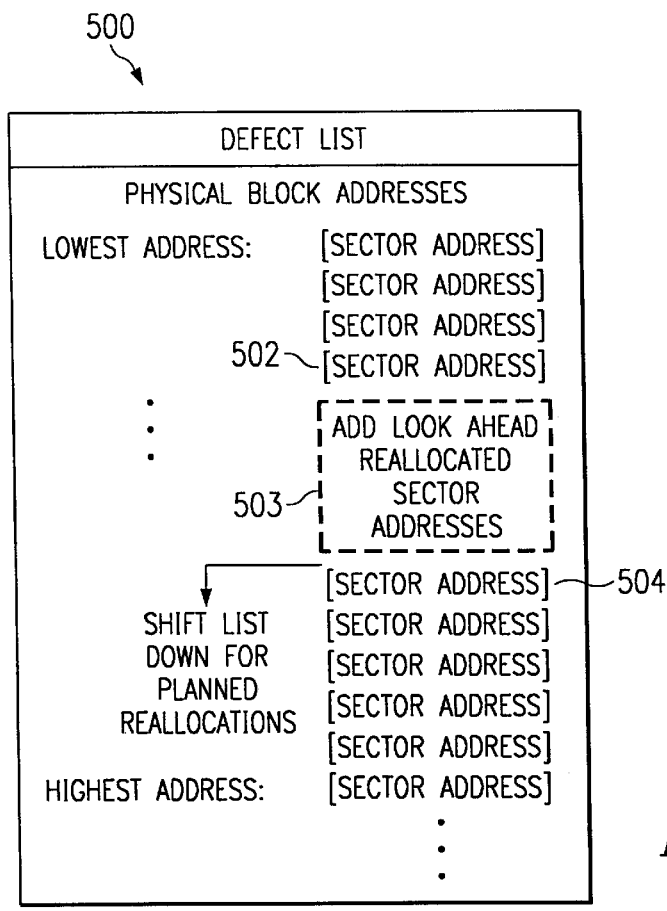

FIG. 4C defines the operations of block A, where the actual look-ahead reallocation is performed in accordance with one embodiment of the present invention. The method begins at an operation 440 where the position in the defect list where entries are to be inserted is found. Exemplary techniques for finding the position in the defect list may include performing a tree search technique or a serial search technique. In the preferred embodiment of the present invention, a tree search technique is used to improve performance. Referring to FIGS. 5A and 5B, a defect list 500 is shown in FIG. 5A having a list of sector addresses. The sector addresses are preferably ordered from the lowest address to the highest address.

In this example, assuming that the new defect location 510 has an address that lies between sector address 502 and 504, the tree search technique will identify a sector address 502 which is less than the target address 506, and a sector address 504 that is greater than the target address 508. Upon determining the new defect location 510 by implementing the tree search technique, the method of FIG. 4C will continue to an operation 442. In operation 442, the defect list is shifted down from the insertion point for entries of all of the reallocations planned. This shifting down will therefore create a gap beginning at the insertion point. FIG. 5B illustrates the shifting of the defect list down for the reallocations planned. The insertion point is therefore defined just after the sector address 502.

Once the defect list has been shifted down, the gap 503 is created which leaves space for adding the look-ahead reallocation sector addresses. The method of FIG. 4C now proceeds to operation 444 where the entries from the queue (containing sector addresses planned to be reallocated), are transferred into the gap in the defect list shown in FIG, 5B. Once the transfer from the queue into the gap in the defect list has been performed, the method will proceed to an operation 446. In operation 446, the recorded number of entries is incremented by the number of entries inserted during the look-ahead reallocation.

Once this increment has been performed, the method proceeds to an operation 448 where the new reallocations are assigned destination addresses. This is performed if any new reallocations are utilizing the relocation method. The method will now proceed to an operation 450 where the new entries are sorted with the pre-existing entries beginning from the insertion point downward. This is needed if some look-ahead reallocations were avoided due to existing reallocations. Once the sorting has been performed if necessary, the method will proceed to an operation 452 where the user data is moved as necessary if any new reallocations were block slips. Once the move has been performed if necessary, the method will proceed to an operation 454 where the defect list is written to the disk (e.g., the media).

In certain cases, the defect list may be written in redundant copies to the media to ensure that at least one good copy exists if defects are present where the defect list is being written. At this point, the method will proceed to operation 456 where data transfers are resumed at the original unwritable block forward. The method will therefore continue performing the data transfer until a new defect is found during the write operation. When a new defect is found, the method will traverse back to decision operation 402 of FIG. 4A, where the method begins anew.

The present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language available from IEEE of New York, New York may be used to design an appropriate silicon-level layout.

The invention may employ various computer-implemented operations involving data stored in computer systems to drive computer peripheral devices. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. For example, Although specific reference to "off-track" servo field errors is addressed herein, the methods, systems, computer implemented methods, and techniques of the present invention are equally applicable to any other type of well known "servo filed error" that may be encountered during a writing operation. Accordingly, the present embodiments are to be considered as illustrative and not restrictive, and the invention is not to be limited to the details given herein, but may be modified within the scope and equivalents of the appended claims.

What is claimed is:

1. A storage media defect management method, comprising:

writing data to a storage media having a plurality of servo fields;

stopping the writing upon detecting an off-track or other servo field error with a particular servo field of the plurality of servo fields;

reallocating a plurality of suspect sectors that may be affected by the off-track or other servo field error detected in the particular servo field prior to resumption of writing; and resuming the writing beginning with a next sector following the plurality of suspect sectors that were reallocated.

2. A storage media defect management method as recited in claim 1, further comprising:

determining whether at least one reallocation location is available on the storage media, and if there is at least one reallocation location available, the method includes, determining whether a suspect target sector has already been reallocated.

3. A storage media defect management method as recited in claim 2, wherein if the determination is made that the suspect target sector was not already reallocated, the method includes, setting a look-ahead reallocation number N.

4. A storage media defect management method as recited in claim 3, wherein the look-ahead reallocation number N is a max number of sectors that can be affected by the off track or other servo field error.

5. A storage media defect management method as recited in claim 3, wherein the look-ahead reallocation number N is a max number of sectors that can be affected by the off track or other servo field error in a current zone of the storage media.

6. A storage media defect management method as recited in claim 3, wherein the look-ahead reallocation number N is a max number of sectors calculated to be affected by the off track or other servo field error.

7. A storage media defect management method as recited in claim 3, further comprising:

setting the suspect target sector to be an initial sector in error of the plurality of suspect sectors;

setting a reallocations planned equal to zero, wherein the reallocations planned is less than or equal to the look-ahead reallocation number N;

setting a transfer count equal to zero; and setting a loop count equal to zero.

8. A storage media defect management method as recited in claim 7, further comprising:

performing preliminary reallocation test checks, including, determining whether the loop count is less than the look-ahead reallocation number N;

determining whether the reallocations planned is less than relocation locations available on the storage media; and determining whether the transfer count is less than a data available on a data buffer, the data buffer configured to receive data from a host computer for writing to the storage media.

9. A storage media defect management method as recited in claim 8, wherein the performing preliminary reallocation test checks further include:

determining whether a current sector of the plurality of suspect sectors is on a current track that contains the off track or other servo field error;

determining whether the current sector of the plurality of suspect sectors is on another volume of the storage media.

10. A storage media defect management method as recited in claim 9, wherein after the preliminary reallocation test checks are performed, the method further comprises:

determining whether the current sector of the plurality of suspect sectors is in a reserved area on the storage media;

determining whether the current sector of the plurality of suspect sectors was previously slipped; and determining whether the current sector of the plurality of suspect sectors was previously relocated.

11. A storage media defect management method as recited in claim 10, wherein if the determinations suggest that reallocation of the current sector of the plurality of suspect sectors is proper, the method further includes, recording the current sector of the plurality of suspect sectors in a queue;

incrementing the reallocations planned by one;

incrementing the transfer count; and incrementing the loop control; and incrementing to a next sector after the current sector in the plurality of suspect sectors.

12. A storage media defect management method as recited in claim 10, wherein one only those sectors of the plurality of suspect sectors identified in the queue are reallocated and the reallocated ones of the plurality of suspect sectors is less than or equal to the look-ahead reallocation number N.

13. A storage media defect management method as recited in claim 12, wherein the reallocation further comprises:

finding an initial position in a defect list for the plurality of suspect sectors to be reallocated;

shifting existing entries of the defect list to define a gap to enable insertion of addresses of the plurality of suspect sectors to be reallocated;

transferring entries from the queue into the gap in the defect list;

incrementing a record number of entries in the defect list by the plurality of suspect sectors to be reallocated;

assigning destination addresses to the plurality of suspect sectors to be reallocated;

sorting the entries with the existing entries beginning from the initial position in the defect list.

14. A storage media defect management method as recited in claim 13, wherein the reallocation further comprises:

moving data for the plurality of suspect sectors to be reallocated to the destination addresses;

writing the sorted defect list to the storage media; and resuming the writing of the data to the storage media from a point after the plurality of suspect sectors that were reallocated.

15. A sector reallocation system for performing defect management of data being written from a host computer to a storage media, comprising:

transferring data to be written on the storage media from the host to a data buffer;

writing data from the data buffer to a track on the storage media, the storage media having a plurality of servo fields;

discontinuing the writing to the track on the storage media upon detecting an error in a recent servo field of the plurality of servo fields, and retrying the writing until a retry counter expires due to a continued detection of the error in the recent servo field;

setting a maximum look-ahead reallocation that defines a maximum number of sectors that can be affected by the error detected in the recent servo field of the storage media;

performing a number of checks to ascertain a number of planned sectors of the maximum number of sectors that are to be reallocated, such that the number of planned sectors is less than or equal to the maximum number of sectors;

reallocating the number of planned sectors; and resume the writing of the data from the data buffer to the track on the storage media beginning with a next sector after the reallocated number of planned sectors.

16. A sector reallocation system for performing defect management of data being written from a host computer to a storage media as recited in claim 15, wherein the maximum number of sectors that can be affected by the error detected in the recent servo field of the storage media is set depending on what zone of a plurality of zones of the storage media the track is located.

17. A sector reallocation system for performing defect management of data being written from a host computer to a storage media as recited in claim 15, wherein the performing of the number of checks to ascertain the number of planned sectors of the maximum number of sectors that are to be reallocated further comprising:

determining whether there is at least one reallocation location available on the storage media; and determining whether a first sector of the maximum number of sectors has already been reallocated.

18. A sector reallocation system for performing defect management of data being written from a host computer to a storage media as recited in claim 15, further comprising:

performing a tree search to identify a position in a defect list where addresses associated with the number of planned sectors that are to be reallocated will be placed;

shifting the defect list from the position to make a gap for the addresses of the number of planned sectors;

transferring address entries into the gap in the defect list from a queue; and reallocating the number of planned sectors.

19. A sector reallocation system for performing defect management of data being written from a host computer to a storage media as recited in claim 17, wherein the performing of the number of checks to ascertain the number of planned sectors of the maximum number of sectors that are to be reallocated further comprising:

determining whether the data buffer contains the data to complete the reallocation of the number of planned sectors;

determining whether each of the maximum number of sectors are on the track being written; and determining whether any of the maximum number of sectors are past a current volume.

20. A sector reallocation system for performing defect management of data being written from a host computer to a storage media as recited in claim 18, further comprising:

incrementing a record of a number of entries in the defect list by the number of planned sectors;

assigning destination addresses for the number of planned sectors to be reallocated;

sorting the defect list; and performing the reallocation by moving data for the number of planned sectors to a reserve pool.

21. A sector reallocation system for performing defect management of data being written from a host computer to a storage media as recited in claim 19, wherein the performing of the number of checks to ascertain the number of planned sectors of the maximum number of sectors that are to be reallocated further comprising:

determining whether any of the maximum number of sectors are in a reserved area on the storage media;

determining whether any of the maximum number of sectors have been slipped; and determining whether any of the maximum number of sectors were previously relocated.

22. A sector reallocation system for performing defect management of data being written from a host computer to a storage media as recited in claim 20, further comprising:

writing the defect list to the storage media.

23. A sector reallocation system for performing defect management of data being written from a host computer to a storage media as recited in claim 20, wherein the storage media is part of a peripheral device.

24. A sector reallocation system for performing defect management of data being written from a host computer to a storage media as recited in claim 23, wherein the peripheral device is one of a fixed media device and a removable media device.

25. A computer readable media containing program instructions for performing sector reallocation defect management, the computer readable media comprising:

program instructions for initiating a writing of data to a storage media having a plurality of servo fields;

program instructions for causing a discontinuation of the writing upon detecting a servo field error with a particular servo field of the plurality of servo fields;

program instructions for detecting when a re-try counter has expired;

program instructions for causing a batch reallocation of a plurality of suspect sectors that may be affected by the servo field error detected in the particular servo field prior to continuation of the writing; and program instructions for causing a continuation of the writing beginning with a next sector following the plurality of suspect sectors that were reallocated.

26. A computer controlled reallocation defect management method implemented on hardware and directed by program instructions, the method comprises:

initiating a writing of data to a storage media having a plurality of servo fields;

causing a discontinuation of the writing upon detecting a servo field error with a particular servo field of the plurality of servo fields;

detecting when a re-try counter has expired;

causing a batch reallocation of a plurality of suspect sectors that may be affected by the servo field error detected in the particular servo field; and causing a continuation of the writing beginning with a next sector following the plurality of suspect sectors that were reallocated.

27. A computer implemented storage media defect management method, comprising:

writing data to a storage media having a plurality of servo fields;

stopping the writing upon detecting a servo field error with a particular servo field of the plurality of servo fields;

reallocating a plurality of suspect sectors that may be affected by the servo field error detected in the particular servo field; and resuming the writing beginning with a next sector following the plurality of suspect sectors that were reallocated.

28. A computer implemented storage media defect management method as recited in claim 27, further comprising:

determining whether at least one reallocation location is available on the storage media, and if there is at least one reallocation location available, the method includes, determining whether a suspect target sector has already been reallocated.

29. A computer implemented storage media defect management method as recited in claim 28, wherein if the determination is made that the suspect target sector was not already reallocated, the method includes, setting a look-ahead reallocation number N.

30. A computer implemented storage media defect management method as recited in claim 29, wherein the look-ahead reallocation number N is a max number of sectors that can be affected by the servo field error.

31. A computer implemented storage media defect management method as recited in claim 29, wherein the look-ahead reallocation number N is a max number of sectors that can be affected by the servo field error in a current zone of the storage media.

32. A computer implemented storage media defect management method as recited in claim 29, wherein the look-ahead reallocation number N is a max number of sectors calculated to be affected by the servo field error.

33. A computer implemented sector reallocation system for performing defect management of data being written from a host computer to a storage media, comprising:

transferring data to be written on the storage media from the host to a data buffer;

writing data from the data buffer to a track on the storage media, the storage media having a plurality of servo fields;

discontinuing the writing to the track on the storage media upon detecting an error in a recent servo field of the plurality of servo fields, and retrying the writing until a retry counter expires due to a continued detection of the error in the recent servo field;

setting a maximum look-ahead reallocation that defines a maximum number of sectors that can be affected by the error detected in the recent servo field of the storage media;

performing a number of checks to ascertain a number of planned sectors of the maximum number of sectors that are to be reallocated, such that the number of planned sectors is less than or equal to the maximum number of sectors;

reallocating the number of planned sectors; and resume the writing of the data from the data buffer to the track on the storage media beginning with a next sector after the reallocated number of planned sectors;

wherein the maximum number of sectors that can be affected by the error detected in the recent servo field of the storage media is set depending on what zone of a plurality of zones of the storage media the track is located.

34. A computer implemented sector reallocation system for performing defect management of data being written from a host computer to a storage media as recited in claim 33, wherein the performing of the number of checks to ascertain the number of planned sectors of the maximum number of sectors that are to be reallocated further comprising:

determining whether there is at least one reallocation location available on the storage media; and determining whether a first sector of the maximum number of sectors has already been reallocated.

\* \* \* \* \*